United States Patent [19]
Fujihara

[11] Patent Number: 5,187,730
[45] Date of Patent: Feb. 16, 1993

[54] X-RAY DIAGNOSTIC SYSTEM AND METHOD OF PICKING UP X-RAY PICTURE

[75] Inventor: Shigemi Fujihara, Tochigi, Japan

[73] Assignee: Kabushiki Kaisha Toshiba, Kanagawa, Japan

[21] Appl. No.: 718,406

[22] Filed: Jun. 24, 1991

[30] Foreign Application Priority Data

Jun. 25, 1990 [JP] Japan ................................. 2-164306

[51] Int. Cl.⁵ .............................................. H05G 1/42
[52] U.S. Cl. ...................................... 378/97; 378/99; 378/108
[58] Field of Search .................. 378/97, 96, 98, 99, 378/108–112, 114; 358/111

[56] References Cited

U.S. PATENT DOCUMENTS

| | | | |
|---|---|---|---|
| 4,309,613 | 1/1982 | Brunn et al. | 378/110 |
| 4,649,558 | 3/1987 | Brunn et al. | 378/97 |
| 4,857,724 | 8/1989 | Snoeren . | |
| 4,901,336 | 2/1990 | Nishiki | 378/97 |
| 4,901,337 | 2/1990 | Fujimoto . | |
| 5,022,063 | 6/1991 | Yokouchi et al. | 378/99 |

Primary Examiner—David P. Porta
Attorney, Agent, or Firm—Finnegan, Henderson, Farabow, Garrett and Dunner

[57] ABSTRACT

According to the present invention, there is provided an X-ray diagnostic system comprising, an X-ray generator irradiating X-ray toward a patient, an image intensifier transforming the X-ray which has passed the patient to fluorescent light, a CCD for converting the fluorescent light to picture signal under a predetermined optimum quantity of light, a photodiode for detecting quantity of the fluorescent light, a quantity-of-light controller for judging whether the quantity of the fluorescent light detected reaches the predetermined optimum quantity of light at the CCD, an X-ray controller for cutting off the X-ray when the quantity of the fluorescent light reaches the predetermined optimum quantity of light, and a television monitor for displaying an X-ray picture based on the picture signal. This X-ray diagnostic system employs a method of picking up an X-ray picture featured by steps of integrating quantity of the fluorescent light detected by the photodiode and comparing an integrated quantity of the fluorescent light with a predetermined quantity of light accomplishing a quality X-ray picture, and cutting off the X-ray when the integrated quantity of the fluorescent light reaches the predetermined quantity of light. This X-ray diagnostic system and a method used herein enable a quality X-ray picture.

23 Claims, 5 Drawing Sheets

X-RAY DIAGNOSTIC SYSTEM AND METHOD OF PICKING UP X-RAY PICTURE

BACKGROUND OF THE INVENTION

The present invention relates to an X-ray diagnostic system which produces an X-ray picture for diagnosis of a patient and a method of picking up an X-ray picture employed in this X-ray diagnostic system, both of which produce a quality X-ray picture.

An X-ray diagnostic system both of generally comprises an X-ray generator, an image intensifier (abbreviated as "I.I." hereinafter), an imaging device such as a pickup tube or a solid-state image sensor (including a CCD [Charge Coupled Device]), and a television monitor.

The X-ray generator is furnished with an X-ray tube generating X-rays whose intensity depends upon the X-ray tube voltage and the X-ray tube current. X-rays generated by the X-ray generator pass through a patient and enter the I.I. The I.I. converts the incident X-rays to fluorescent light in proportion to the X-ray transmittance in each part of the patient. The fluorescent light exits the I.I. and goes into the imaging device.

An optical system comprising an iris and tandem lens unit including a plurality of lenses can be disposed between the I.I. and the imaging device so as to have the fluorescent light form an image of the patient at the imaging device. The iris is usually arranged before a rearmost lens of the tandem lenses which causes the fluorescent light to go through its adjustable aperture. The tandem lenses converge the fluorescent light toward the imaging device.

The imaging device is controlled by a CCU (Camera Control Unit) and converts the incident fluorescent light to an electric signal (image signal). Commonly, the image signal is transmitted from the imaging device to an image processor where the image signal is subject to image processing such as noise correction, contrast processing, etc.

After image processing, the image signal is sent out to the television monitor. X-ray images of the patient can be monitored continuously on a screen of the television monitor in accordance with a series of frames. A "frame" means one exposure of continuous X-ray radiography for a television monitor. A frame rate is usually 30 frame/sec. That is, one frame takes 33.3 msec.

The imaging device has its own optimum range of quantity of incident light for forming quality images. The imaging device is unable to form clear images for the quantity of light over or under the optimum range.

For this reason, part of the fluorescent light is taken out of the optical system for one frame so as to detect its quantity. The quantity of the fluorescent light taken out is detected by a quantity-of-light detector. If the quantity of light detected departs from the optimum range of quantity of light, the quantity-of-light detector informs an iris controller of this fact. The iris controller controls the degree of aperture of the iris so as to make the appropriate quantity of the fluorescent light go through a few frames later.

If the quantity of light detected departs so great from the optimum rang of quantity of light that the optimum quantity of light cannot be achieved by adjusting the aperture of the iris only, the quantity-of-light detector informs an X-ray controller of this fact. The X-ray controller controls the X-ray tube voltage or an X-ray tube current at the X-ray generator so that it generates X rays of the optimum intensity which lead to the optimum quantity of the fluorescent light. The control of X-ray intensity by adjusting the X-ray tube voltage or the X-ray tube current requires more time than the adjustment of the aperture of the iris.

Furthermore, if an intensity of X-rays having passed through patient or I.I. magnification (ratio of input size to output size) fluctuates due to a change in a patient diagnosis or for any reason, then quantity of fluorescent light generated at the I.I. changes. Thus, the quantity of fluorescent light has to be detected for each patient, for example, in order to make sure it falls into the optimum range of quantity of light.

However, since the distance between the imaging device and a rearmost lens of the tandem lenses in charge of the last image formation is short and it is difficult to take the fluorescent light from outside of the optical system, the conventional detection of the quantity of light of used to be based on the fluorescent light taken out between a plurality of the tandem lenses.

Namely, whether the quantity of fluorescent light at the imaging device is within its optimum range is judged based on whether the quantity of fluorescent light inside the optical system is within a criterion range estimated as quantity of corresponding to the optimum range of quantity of light at the imaging device which takes in absorption, reflection, etc. of the fluorescent light inside the optical system. Consequently, the judgment of the optimum quantity of light is likely to be inaccurate because of an error of the estimate of the criterion range and an X-ray image of low quality happens to be picked up.

Besides, as mentioned hereinbefore, it is impossible to achieve the estimated criterion in the first frame by the conventional way of adjusting the aperture of the iris and it demands a few frames to realize a desired aperture. Accordingly, a test X-ray exposure which requires some frames has to be performed to determine the estimated criterion prior to pick up an X-ray image for actual diagnosis of a patient, and the patient is exposed to more X-ray.

SUMMARY OF THE INVENTION

An object of the present invention is to substantially eliminate defects or drawbacks encountered in the prior art described above and to provide an X-ray diagnostic system which can accurately detect the actual quantity of light entering the image device which is necessary for obtaining a clear X-ray image.

Another object of the present invention is to provide an X-ray diagnostic system and a method for picking up an X-ray picture which enable to accomplish the optimum quantity of light in the first frame, at once.

These and other objects of the present invention can be achieved in one aspect by providing an X-ray diagnostic system for diagnosing a patient comprising an X-ray generator generating a beam of X-rays toward the patient, an image intensifier converting the X-rays which have passed through the patient to fluorescent light, a converting means for converting the fluorescent light to an image signal under a predetermined optimum quantity of light, a photodetecting means for detecting a quantity of the fluorescent light, a quantity-of-light controlling means for judging if the quantity of the fluorescent light detected reaches the predetermined optimum quantity of light at the pickup means, an X-ray controlling means to stop generating X-rays when the quantity of the fluorescent light reaches the predetermined optimum quantity of light and a display means for displaying an X-ray picture based on the image signal.

In addition, there is also provided for these purposes a method of picking up an X-ray picture comprising the steps of generating a beam of X-rays toward a subject, converting the X-rays having passed through the subject to fluorescent light, converting the fluorescent light to image signal for an X-ray image, detecting a quantity of the fluorescent light, integrating the quantity of the fluorescent light detected, comparing the integrated quantity of the fluorescent light with a predetermined quantity of light accomplishing a quality X-ray picture, and terminating the X-rays when the integrated quantity of the fluorescent light reaches the predetermined quantity of light.

BRIEF DESCRIPTION OF THE DRAWINGS

For a better understanding of the present invention and to show how the same is carried out, reference is made, by way of preferred embodiments, to the accompanying drawings, in which.

DESCRIPTION OF THE PREFERRED EMBODIMENTS

In order to facilitate the understanding of the present invention, two conventional X-ray diagnostic systems will be first described with reference to FIGS. 6 and 7.

Figure 6:
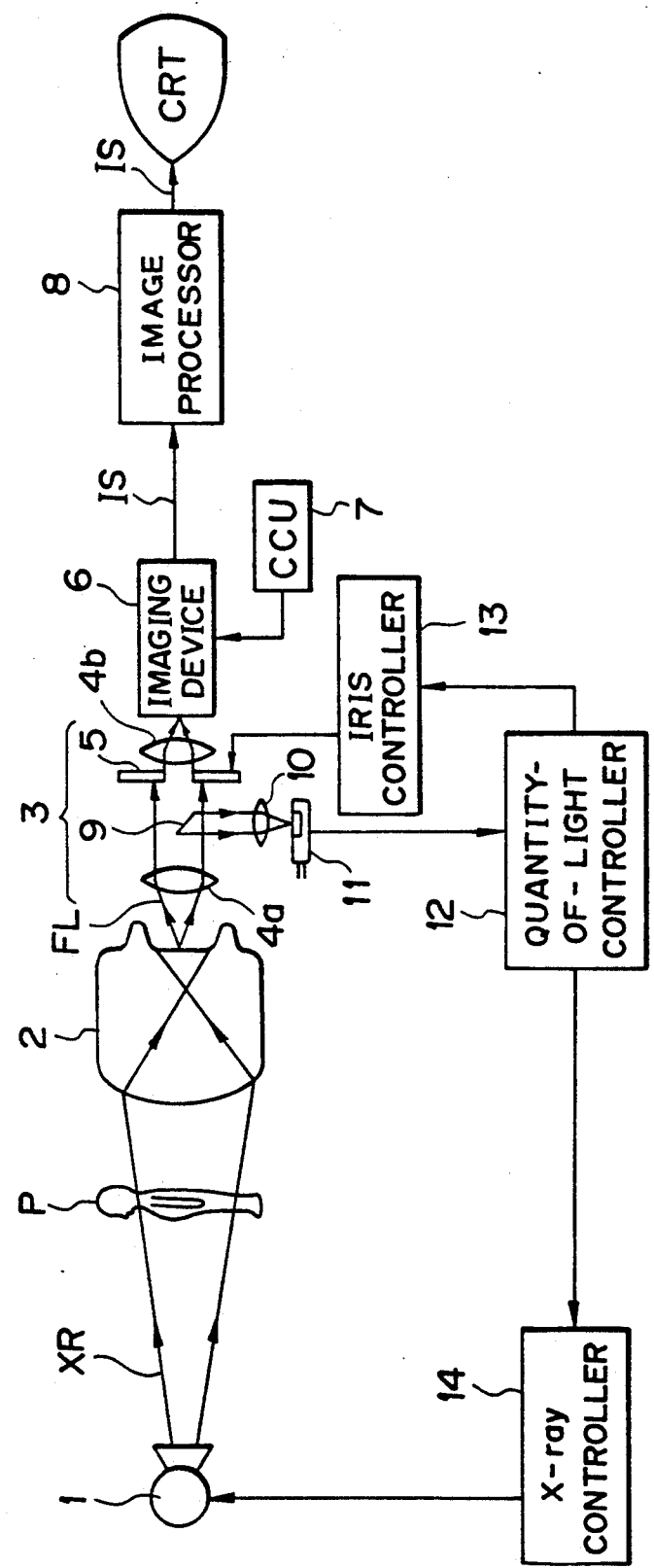
FIG. 6 is a schematic illustration of one conventional X-ray diagnostic system.

FIG. 6 is a schematic illustration of one conventional X-ray diagnostic system.

An X-ray generator 1 generates continuous X-rays XR toward a patient (or a subject) P. X-rays XR pass the patient P, partially absorbed, and enter an I.I. 2. The I.I. 2 converts the incident X-rays XR to fluorescent light FL in proportion to the X-ray transmittance in each part of the patient P and discharges the fluorescent light FL.

The fluorescent light FL goes through an optical system 3 comprising tandem lenses 4a, 4b and an iris 5 and forms an image of the patient P at an imaging device 6. The imaging device 6 is controlled by a CCU 7 and converts the incident fluorescent light FL to image signal IS. The image signal IS is transmitted from the imaging device 6 to an image processor 8 where the image signal is subject to image processing such as noise correction, contrast processing, etc. After the image processing, the image signal is sent out to a television monitor such as cathode ray tube CRT.

Meanwhile, part of the fluorescent light FL is taken out via a small reflecting mirror 9 between a front lens (lens on I.I. 2 side) 4a and the iris 5. The part of the fluorescent light FL taken out is converged by a lens 10 and is led to a photodetector 11 such as a photodiode, a photomultiplier, etc.

The photodetector 11 detects part of quantity of the incident fluorescent light FL and sends out the result to a quantity-of-light controller 12. The quantity-of-light controller 12 checks if the detected quantity of the fluorescent light FL falls into a criterion range corresponding to an optimum range of light at the imaging device 6. The criterion range at the quantity-of-light controller 12 is estimated for part of the quantity of fluorescent light FL inside the optical system 3 concerning the optimum range of quantity of light at the imaging device 6 located behind the optical system 3.

If the quantity of light detected departs from the criterion range, the quantity-of-light controller 12 informs the iris controller 13 of this fact. The iris controller 13 controls the degree of aperture of the iris 5 so as to make the optimum quantity of the fluorescent light FL go through several frames later.

If the quantity of light detected departs so great from the criterion range that the optimum quantity of light cannot be achieved by adjusting the aperture of the iris 5 only, the quantity-of-light controller 12 informs of an X-ray controller 14 of this fact. The X-ray controller 14 controls an X-ray tube voltage or an X-ray tube current at the X-ray generator 1 so that it may generate X-rays of the optimum intensity to realize the optimum quantity of the fluorescent light. The control of X-ray intensity by adjusting the X-ray tube voltage or the X-ray tube current requires more time (i.e. larger number of frames) than that required for controlling the aperture of the iris 5.

Figure 7:
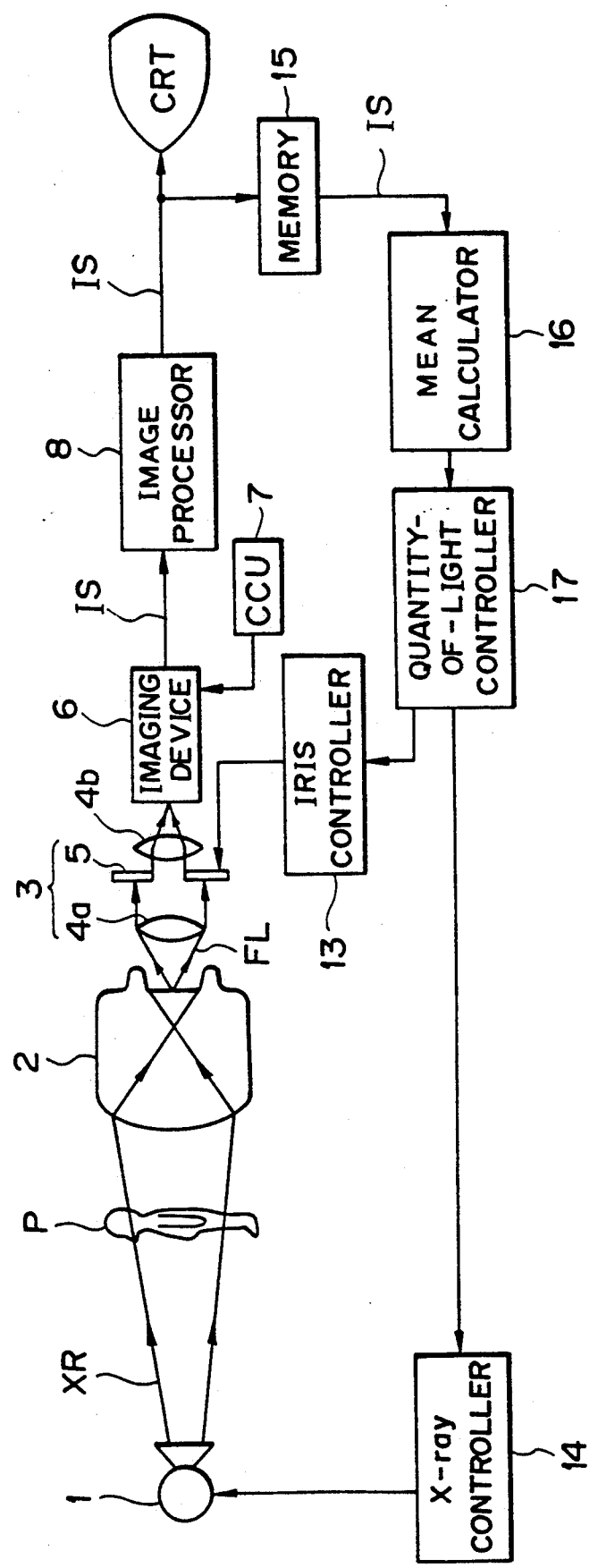
FIG. 7 is a schematic illustration of another conventional X-ray diagnostic system.

FIG. 7 is a schematic illustration of another conventional X-ray diagnostic system. The same reference numerals and codes will be used for the same elements or members as shown in FIG. 6

This X-ray diagnostic system has no photodetecting device, like mirror 9, photodetector 11, etc. shown in FIG. 6.

In this X-ray diagnostic system, the image signal IS outputted from the image processor 8 and proceeding to the television monitor CRT branches to a memory 15 where the image signal IS for each frame are stored with various output levels reflecting the quantity of the fluorescent light FL at the imaging device 6.

Then, the image signal IS for each frame stored gets transmitted to a mean calculator 16 in which a mean of the image signal outputs for each frame is calculated. Finally, the mean of the image signal output is sent out to a quantity-of-light controller 17.

The quantity-of-light controller 17 checks whether or not the mean of the image signal output calculated falls into the criterion range. The criterion range for the mean of the image signal output is estimated as corresponding to the optimum range of fluorescent light FL at the imaging device 6.

If the mean of the image signal output calculated departs from the criterion range, the same procedure as described for the X-ray diagnostic system of FIG. 6 is executed.

These conventional X-ray diagnostic systems have the problems mentioned hereinbefore. In addition, in the X-ray diagnostic system of FIG. 7, since adequacy of the quantity of the fluorescent light entering the imaging device 6 is judged just after converting the fluorescent light to the image signal, it is impossible to adjust the quantity of light in the very first frame.

Embodiments of the present invention will now be described in detail with reference to FIGS. 1-5, in which components common in each embodiment described below will be referred to by the same reference numerals and codes. Further, in order to facilitate the explanation, the reference numerals and codes employed in FIGS. 6 and 7 will be used for the members or elements shown in the following figures, which are substantially identical to those referred to by these reference numerals and codes hereinbefore.

Figure 1:
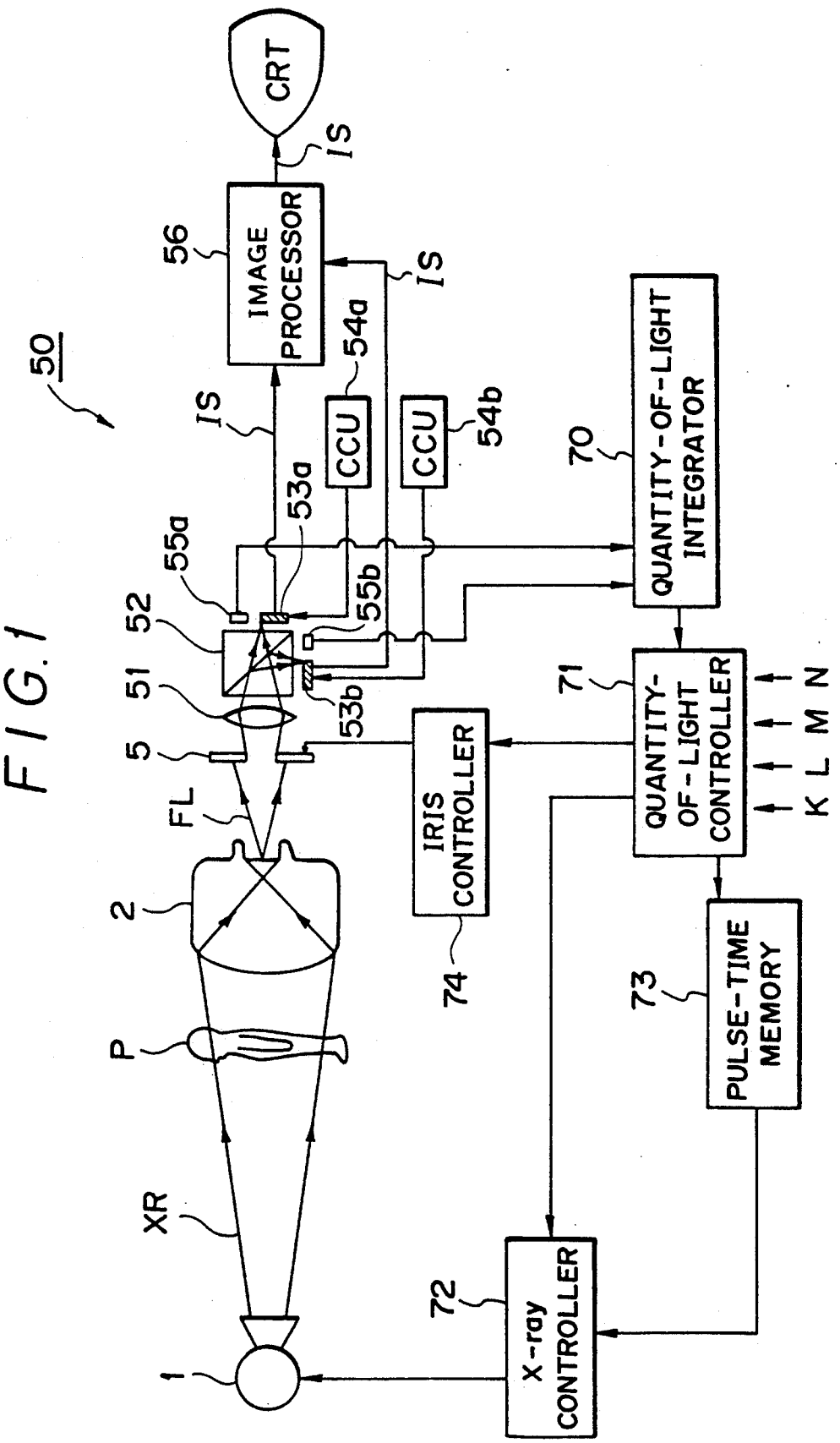
FIG. 1 is a schematic illustration of an X-ray diagnostic system in accordance with a first embodiment of the present invention.

FIG. 1 is a schematic illustration of an X-ray diagnostic system 50 in accordance with a first embodiment of the present invention.

In the X-ray diagnostic system 50 the fluorescent light FL generated by through I.I. 2 first passes the iris 5, the width of its optical path being narrowed. Then, the fluorescent light FL goes into a zoom lens 51 for image formation. The fluorescent light FL which has gone through the zoom lens 51 is split by a beam splitter 52 into two separate optical paths. The fluorescent light FL having been split forms images at CCD's 53a, 53b controlled by CCU's 54a, 54b, respectively. Each CCD 53a, 53b receives the distant half of the split fluorescent light FL that is, that light (corresponding to the lower body and the upper body of the patient P, respectively) split.

On the other hand, the remaining half of the split fluorescent light FL at each side of the CCD's 53a, 53b enters each of photodiodes 55a, 55b which are disposed on the side of the CCD's 53a, 53b, respectively. Accordingly, the photodiodes 55a, 55b can detect just the same quantity of light that enters the CCD's 53b, 53a, respectively.

The image signal IS corresponding to the fluorescent light of the upper and lower body, respectively, generated by the CCD's 53a, 53b are transmitted to an image processor 56 and combined there. Hence, the image processor 56 is able to send out the image signal IS for the whole body of the patient P to the television monitor CRT.

The way in this embodiment of dividing an image of the patient P and picking up an X-ray image for each divided image by means of different CCD's is useful to acquire a high spatial resolution for a large image, since the size (viz. the number of pixels of a single CCD cannot be enlarged unlimitedly in proportion to a size of image due to the restraint of size of an the semiconductor wafer from which a CCD is cut out.

If an optical path of the fluorescent light is separated into n optical paths (n is an integer greater than 1), the quantity of fluorescent light in each optical path becomes 1/n. Accordingly, it is preferable not to separate light into too many optical paths to avoid decreasing the quantity of fluorescent light at each CCD too excessively.

In this embodiment, now that the zoom lens 51 can lengthen its focal distance, keeping a focal position unchanged, the beam splitter 52 can be arranged between the CCD's 53a, 53b and the zoom lens 51, in other words, inserted outside the optical system including the iris 5 and the zoom lens 51. Thus it becomes possible to detect the actual quantity of light entering the CCD's 53a, 53b by the photodiodes 55a, 55b.

Figure 2:
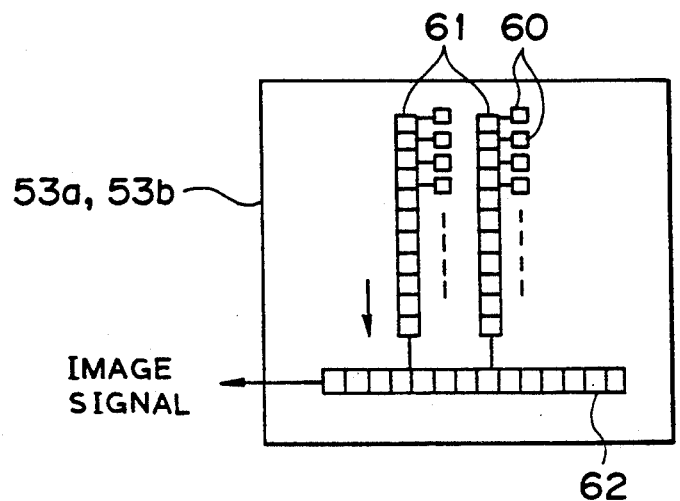
FIG. 2 is an enlarged schematic illustration of a CCD used in the same X-ray diagnostic system.

FIG. 2 is a schematic illustration of the CCD's 53a, 53b. The CCD's 53a, 53b comprise photoelectric conversion cells 60 arranged in matrix, vertical charge transfer lines 61 connected to each photoelectric conversion cell 60, and a horizontal charge transfer line 62 connected to each vertical charge transfer line 61.

Each photoelectric conversion cell 60 converts the incident fluorescent light for each frame to (electric) charge in proportion to the quantity of incident light. The charge generated at the photoelectric conversion cell 60 gets transferred to the vertical charge transfer line 62 by means of a field shift pulse transmitted by the CCU's 54a, 54b during the present frame. The charge transferred to the vertical charge transfer line 62 then moves to the horizontal charge transfer line 62 by way of a line shift pulse transmitted from the CCU's 54a, 54b after the present frame. The charge is taken out of the horizontal charge transfer line 62 as the image signal.

On one hand, if the quantity of an incident light at a certain photoelectric conversion cell 60 is so large that the charge exceeds the maximum collection level for each photoelectric conversion cell 60, then the charge overflows out of the photoelectric conversion cell 60 and the part of the X-ray image corresponding to the photoelectric conversion cell 60 will get whitened and damaged due to overexposure.

On the other hand, if the quantity of an incident light at a certain photoelectric conversion cell 60 is so small that the charge converted is to small, the image signal from the photoelectric conversion cell is short of output. This causes the S/N (Signal to Noise) ratio of the image signal to deteriorate.

The X-ray diagnostic system of this embodiment is free from the overflow of the charge or the deficiency of the image signal output mentioned above for the following reason.

As aforementioned, the photodiodes 55a, 55b receive and detect just the same quantity of the fluorescent light FL as the CCD's 53a, 53b receive That is to say, the quantity of the fluorescent light FL is free of absorption by the zoom lens 51, reflection by the iris 5, etc.

The quantity of the fluorescent light FL depends on the intensity (height and width) of X-ray pulse generated, the aperture of the iris 5 (i.e. width of an optical path of the fluorescent light), brightness (F number) of the zoom lens 51, etc. Thus, in this embodiment there is no need to estimate the quantity of light elsewhere and to worry about any inaccuracy with this estimate at all.

The quantity of light (actually the average quantity of light) detected by the photodiodes 55a, 55b is sent to a quantity-of-light integrator 70 where the quantity of light sent is subject to integration successively from the beginning for each single X-ray pulse. The quantity-of-light integrator 70 is provided with a timer (not shown) for measuring the time from the start of each single X-ray pulse under a predetermined frame rate (30 frame/sec in this embodiment).

The integrated quantity of light and the time from the start of each single X-ray pulse are sent out to a quantity-of-light controller 71. Parameters K, L, M and N are input to the quantity-of-light controller 71 as well. The meaning of each parameter K, L, M and N is as follows.

Figure 3:
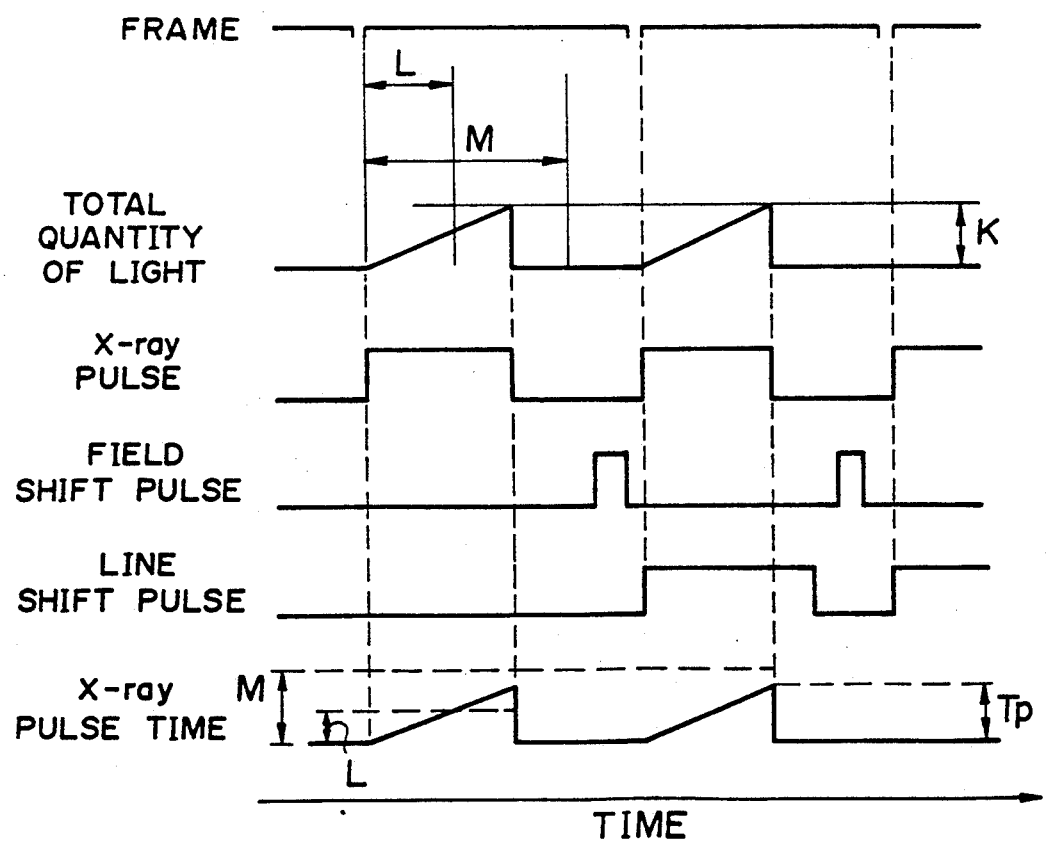
FIG. 3 is a graph showing mutual relationships between a frame, total quantity of light, an X-ray pulse, a field shift pulse, a line shift pulse and X-ray pulse time observed in the same X-ray diagnostic system.

FIG. 3 is a graph showing mutual relationships of a frame, an X-ray pulse, total quantity of light for each X-ray pulse, a field shift pulse, a line shift pulse and X-ray pulse time.

A single X-ray pulse of certain intensity is generated the start of each frame. A total quantity of light (i.e. integrated quantity of light) at the CCD's 53a, 53b is gradually increasing while the X-ray pulse is being generated. The parameter K denotes the optimum quantity of light (actually the optimum average quantity of light) for the CCD's 53a, 53b. This optimum quantity of light is required to be determined between minimum pulse control time as signified by the parameter L and maximum pulse control time as indicated by the parameter M.

In this embodiment, as soon as the total quantity of light at the CCD's 53a, 53b reaches the optimum quantity of light K, the quantity-of-light controller 71 informs the X-ray controller 72 of this fact. Then, the X-ray controller 72 immediately cuts off the X-ray pulse.

Next, the field shift pulse is transmitted from the CCU's 54a, 54b during the time left for the present frame. Consequently, the charge collected in the photoelectric conversion cells 60 of the CCD's 53a, 53b surely gets transferred to the vertical charge transfer line 61 before the next frame starts.

The charge transferred to the vertical charge transfer line 61 then moves to the horizontal charge transfer line 62 in response to the line shift pulse. The line shift pulse does not need to be transmitted during the present frame, since the charge for the next frame never overlaps the one for the present frame in the photoelectric conversion cells 60.

In case the optimum quantity of light K is realized between the minimum pulse control time L and the maximum pulse control time M, the X-ray pulse time Tp comes to fall between these pulse control times L and M. This X-ray pulse time Tp is sent from the quantity-of-light controller 71 to a pulse-time memory device 73 and is stored there.

According to this embodiment, it is possible to attain the optimum quantity of light in the very first frame for this case. In this case, either a larger nor a smaller quantity of light for some part of an image causes the overflow of the charge at the photoelectric conversion cell 60 or the output shortage of an image signal.

From the next frame on, the X-ray controller 72 cuts off the x-ray pulse in accordance to the X-ray pulse time Tp taught by the pulse-time memory 73. The process of determining the X-ray pulse time Tp in this case could be called "the first adjusting loop".

Unless the optimum quantity of light K is accomplished between the minimum pulse control time L and the maximum pulse control time M, it is impossible to obtain the X-ray pulse time Tp enabling the optimum quantity of light K in the first frame.

It takes at least the minimum pulse control time L for the quantity-of-light controller 71 to gain the integrated quantity of light via the quantity-of-light integrator 70. On the other hand, unless the X-ray pulse is cut off before the maximum pulse control time M, the field shift pulse transmitted after the maximum pulse control time M transfers the deficient charge to the vertical charge transfer line 61 and the charge collected after the field shift pulse for the present frame overlaps the one for the next frame.

On one hand, if the quantity of light exceeds the optimum quantity of light K as the minimum pulse control time L passes, the quantity-of-light controller 71 instructs the X-ray controller 72 to make the X-ray pulse cut off without delay. Otherwise, the charge overflows out of the photoelectric cell 60.

On the other hand, in case the quantity of light does not reach the optimum quantity of light K until the maximum pulse control time M goes by, the quantity-of-light controller 71 instructs the X-ray controller 72 to make the X-ray pulse cut off, too. Otherwise, the aforementioned difficulty occurs.

In these cases, the quantity-of-light controller 71 orders an iris controller 74 to adjust the aperture of the iris 5. Namely, when the quantity of light exceeds the optimum quantity of light K as the minimum pulse control time L passes, the iris controller 74 has the iris 5 narrow its aperture. On the other hand, when the quantity of light is less than the optimum quantity of light K as the maximum pulse control time M goes by, the iris controller 74 has the iris 5 enlarge its aperture.

This adjustment of the aperture of the iris 5 can finish a couple of frames later. Then, under a new aperture of the iris 5 a new quantity of the fluorescent light is detected. If the quantity of light reaches the optimum quantity of light K between the minimum pulse control time L and the maximum pulse control time M, it is possible to fix the X-ray pulse time Tp in compliance with the first adjusting loop. Otherwise, the adjustment of the aperture of the iris 5 is repeated until the optimum quantity of light K is attained between the minimum pulse control time L and the maximum pulse control time M.

The aforementioned parameter N is the number of frames assigned to get the optimum quantity of light in terms of X-ray exposure to a patient. The adjustment of the aperture of the iris 5 is performed considering the discrepancy between the quantity of light detected and the optimum quantity of light K so that the number of frames necessary to achieve the optimum quantity of light K is less than the parameter N.

The process of determining the X-ray pulse time Tp including this adjustment of the aperture of the iris 5 could be called "the second adjusting loop".

If it turns out that it is unfortunately impossible yet to make the quantity of light fall between the minimum pulse control time L and the maximum pulse control time M by adjusting the aperture of the iris 5, the X-ray controller 71 directs the X-ray controller 74 to decrease or increase the X-ray tube current or the X-ray tube voltage in the X-ray generator 1 so as to decrease or increase the height (output level) of the X-ray) pulse. If the X-ray pulse height decreases or increases, then the quantity of the fluorescent light becomes smaller or greater, respectively.

The control of the X-ray pulse height by adjusting the X-ray tube current or the X-ray tube voltage takes more time than the adjustment of the aperture of the iris 5. This, however, seldom takes place.

Then, under a new X-ray tube current or X-ray tube voltage the aperture of the iris 5 is adjusted and a new quantity of the fluorescent light is detected. If the quantity of light still is not realized between the minimum pulse control time L and the maximum pulse control time M by adjusting the aperture of the iris 5, further adjustment of the X-ray tube current or the X-ray tube voltage is carried out. The process of determining the X-ray pulse time Tp including this adjustment of the X-ray tube current or the X-ray tube voltage could be called "the third adjusting loop".

Like the adjustment of the aperture of the iris 5 in the second adjusting loop, the control of X-ray intensity by adjusting the X-ray tube voltage or the X-ray tube current is performed so that the number of frames necessary to accomplish the optimum quantity of light K is less than the parameter N.

While the quantity of the fluorescent light is adjusted through the first, the second and the third adjusting loops, in this order, the number of frames necessary to accomplish the optimum quantity of light K is reduced, most preferably, to one. As a result, the patient can escape the X-ray exposure which has nothing to do with the actual diagnosis.

Incidentally, supposing that a pickup tube is employed to receive the fluorescent light in place of the CCD's 53a, 53b, the pickup tube needs time to scan electric beam for each frame.

Figure 4:
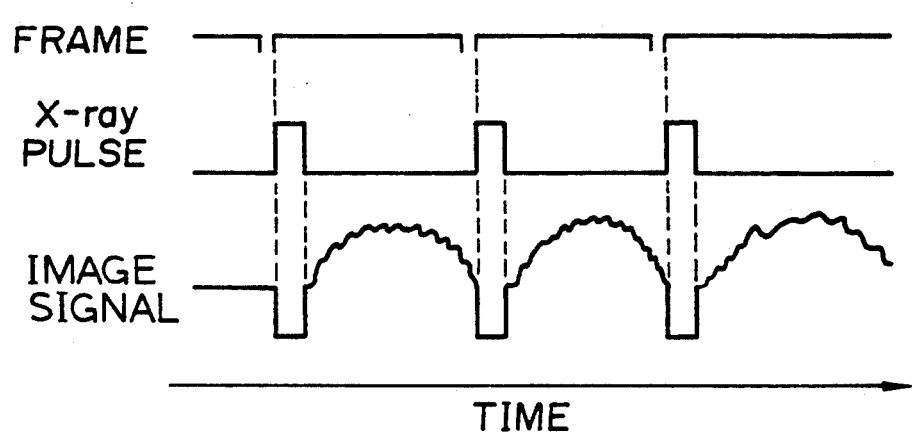
FIG. 4 is a graph showing mutual relationships between a frame, an X-ray pulse and image signal observed in a pickup tube.

FIG. 4 is a graph showing mutual relationships between a frame, X-ray pulse and image signal in case of using a pickup tube. As seen from the FIG. 4, the X-ray pulse time for each frame must be shortened to ensure the sufficient time for the image signal which is regulated by the scanning time at the pickup tube.

Figure 5:
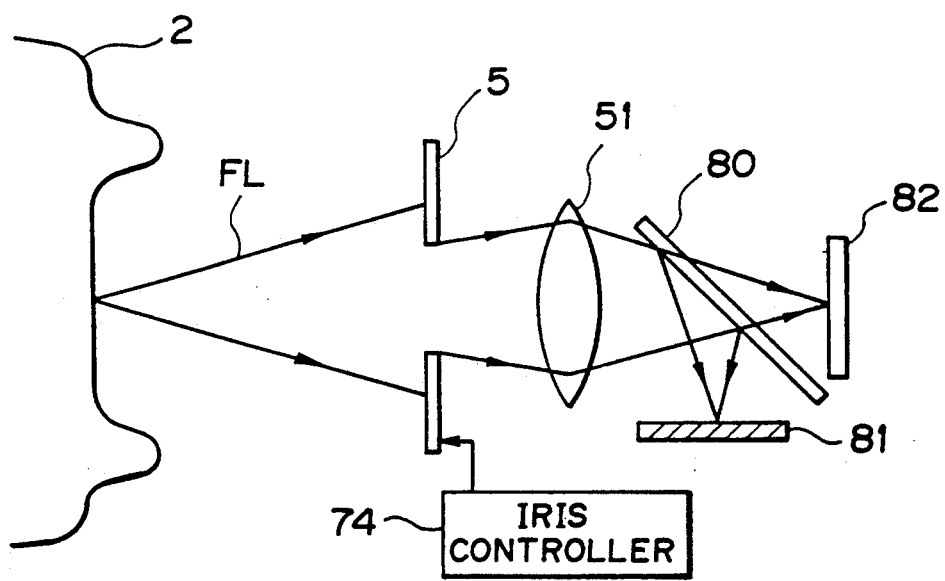
FIG. 5 is a schematic illustration of an optical system in a X-ray diagnostic system in accordance with a second embodiment of the present invention.

When a frame rate is 30 frame/sec., the X-ray pulse time has to be under approximately 4 msec which is too short to control in the aforementioned first adjusting loop. Thus, it is preferable to employ a solid-state image sensor, e.g. a CCD, as an imaging means FIG. 5 is a schematic illustration of an optical system in an X-ray diagnostic system in accordance with a second embodiment of the present invention. The same members as shown in FIG. 1 are referred to by the same reference numerals and codes, while the explanation regarding these members is omitted. This second embodiment employs the same members or elements for the X-ray diagnostic system as explained in the previous embodiment except for the optical system.

A half mirror 80 which transmits half of the fluorescent light FL and reflects the other half is disposed behind the zoom lens 51. On one hand, the fluorescent light FL reflected by the half mirror 80 forms images at the CCD 81. On the other hand, the fluorescent light FL transmitted through the half mirror 80 gets to a photodiode 82 which detects the quantity of incident light.

The quantity of the fluorescent light FL detected at photodiode 82 in this embodiment is the same as that which enters the CCD 81, like the previous embodiment, and there is no need to estimate the quantity of the fluorescent light received by the CCD 81.

It is to be understood that the present invention is not limited to the described preferred embodiments and many other changes and modifications may be made according to the present invention without departing from the scope of the appended claims.

What is claimed is:

1. An X-ray diagnostic system for diagnosing a patient comprising:
    an X-ray generator generating a beam of X rays comprising continuous X-ray pulses toward the patient;
    an image intensifier converting the X rays which have passed through the patient into fluorescent light;
    an optical system having a lens means for converging the fluorescent light and a beam splitter means for splitting the fluorescent light into a plurality of optical paths;
    converting means for converting the converged, split fluorescent light into image signals, the quantity of the fluorescent light required by the converting means being a predetermined value;
    photodetecting means for detecting the quantity of the converged, split fluorescent light;
    quantity-of-light judging means for judging whether the quantity of the fluorescent light detected by the photodetecting means reaches the predetermined value;
    X-ray controlling means for stopping the X-ray generator from generating X rays when the quantity-of-light judging means judges that the quantity of the fluorescent light reaches the predetermined value; and
    image producing means having a display unit for displaying an X-ray image in response to the image signals.

2. The X-ray diagnostic system according to claim 1, wherein said lens means comprises a zoom lens.

3. The X-ray diagnostic system according to claim 2, wherein the image producing means includes means for displaying on the display unit a series of frames of the image at a predetermined frame rate, the continuous X-ray pulses corresponding to the predetermined frame rate.

4. The X-ray diagnostic system according to claim 3, wherein said converting means includes a solid-state imaging sensor.

5. The X-ray diagnostic system according to claim 4, wherein said solid-state imaging sensor comprises a plurality of charge coupled devices.

6. The X-ray diagnostic system according to claim 3, wherein said photodetecting means includes a plurality of photodiodes.

7. An X-ray diagnostic system for diagnosing a patient comprising:
    an X-ray generator generating a beam of X rays comprising continuous X-ray pulses toward the patient;
    an image intensifier converting the X rays which have passed through the patient into fluorescent light;
    an optical system having lens means for converging the fluorescent light and beam splitter means for splitting the fluorescent light into a plurality of optical paths;
    converting means for converting the converged, split fluorescent light into image signals, the quantity of the fluorescent light required by the converting means being a predetermined value;
    photodetecting means for detecting the quantity of the converged, split fluorescent light;
    integrating means for integrating the quantity of fluorescent light detected by the photodetecting means;
    quantity-of-light judging means for judging whether the quantity of integrated fluorescent light reaches the predetermined value;
    X-ray controlling means for stopping the X-ray generator from generating X rays when the quantity-of-light judging means judges that the quantity of the fluorescent light reaches the predetermined value; and
    image producing means having a display unit for displaying an X-ray image in response to the image signals.

8. The X-ray diagnostic system according to claim 7, wherein said lens means comprises a zoom lens.

9. The X-ray diagnostic system according to claim 8, wherein the image producing means includes means for displaying on the display unit a series of frames of the image at a predetermined frame rate, the continuous X-ray pulses corresponding to the predetermined frame rate.

10. The X-ray diagnostic system according to claim 9, wherein said converting means includes a solid-state imaging sensor.

11. The X-ray diagnostic system according to claim 10, wherein said solid-state imaging sensor comprises of a plurality of charge coupled devices.

12. The X-ray diagnostic system according to claim 9, wherein said photodetecting means includes a plurality of photodiode.

13. The X-ray diagnostic system according to claim 9, wherein said optical system further comprises iris means having an adjustable aperture through which the fluorescent light travels and said X-ray diagnostic system further comprises iris controlling means for adjusting the aperture of the iris means in response to the integrating means and the quantity-of-light judging means.

14. The X-ray diagnostic system according to claim 13, wherein said integrating means further comprises a timer for measuring a time period of integration, said quantity-of-light judging means further comprises means for judging whether the measured time period is within a specified range, and said iris controlling means adjusts the aperture of said iris means at times when said time period is outside the predetermined range.

15. The X-ray diagnostic system according to claim 14, wherein said X-ray diagnostic system further comprises storing means for storing said time period measured by the timer and said X-ray controlling means further comprises a mechanism for generating said X-ray pulses having the same time period as the time period stored in the storing means.

16. The X-ray diagnostic system according to claim 9, wherein said X-ray generator includes an X-ray tube for generating X rays having an intensity dependent upon the X-ray tube voltage and the X-ray tube current and said X-ray controlling means further comprises means for adjusting at least one of the X-ray tube voltage and the X-ray tube current.

17. The X-ray diagnostic system according to claim 16, wherein said integrating means further comprises a timer for measuring a time period of light integration, said quantity-of-light judging means further comprises means judging whether the measured time period is within a predetermined range, and said X-ray controlling means adjusts at least one of the X-ray tube voltage and the X-ray tube current when said time period is outside the predetermined range.

18. An X-ray diagnostic system for diagnosing a patient comprising:

an X-ray generator generating a beam of X rays comprising continuous X-ray pulses toward the patient;

an image intensifier converting X rays which has passed through the patient to fluorescent light;

an optical system having a lens means for converging the fluorescent light and a half mirror means for splitting the fluorescent light into a plurality of optical paths;

converting means for converting the converged, split fluorescent light, the quantity of the fluorescent light required by the converting means being a predetermined optimum value;

photodetecting means for detecting the quantity of the converged, split fluorescent light;

quantity-of-light judging means for judging whether the quantity of the detected fluorescent light detected by the photodetecting means reaches the predetermined value;

X-ray controlling means for stopping the X-ray generator from generating X rays when the quantity-of-light judging means judges that the quantity of fluorescent light reaches the predetermined value; and image producing means having a display unit for displaying an X-ray image in response to the image signals.

19. The X-ray diagnostic system according to claim 18, wherein said lens means comprises a zoom lens.

20. The X-ray diagnostic system according to claim 19, wherein the image producing means includes means for displaying on the display unit a series of frames of the image at a predetermined frame rate, the continuous X-ray pulses corresponding to the predetermined frame rate.

21. The X-ray diagnostic system according to claim 20, wherein said converting means includes a solid-state imaging sensor.

22. The X-ray diagnostic system according to claim 21, wherein said solid-state imaging sensor comprises a plurality of charge coupled devices.

23. The X-ray diagnostic system according to claim 20, wherein said photodetecting means includes a photodiode.

* * * * *

UNITED STATES PATENT AND TRADEMARK OFFICE
CERTIFICATE OF CORRECTION

PATENT NO. : 5,187,730
DATED : February 16, 1993
INVENTOR(S) : Shigemi Fujihara

It is certified that error appears in the above-indentified patent and that said Letters Patent is hereby corrected as shown below:

Claim 12, column 11, line 9, change "photodiode" to --photodiodes --.
Claim 17, column 11, line 43, before "judging" insert --for --.

Signed and Sealed this

First Day of March, 1994

Attest:

BRUCE LEHMAN

Attesting Officer

Commissioner of Patents and Trademarks